(12) United States Patent
Wei et al.

(10) Patent No.: US 7,020,316 B2
(45) Date of Patent: Mar. 28, 2006

(54) VESSEL-FEEDING PULMONARY NODULE DETECTION BY VOLUME PROJECTION ANALYSIS

(75) Inventors: Guo-Qing Wei, Plainsboro, NJ (US); Jianzhong Qian, Princeton Junction, NJ (US); Li Fan, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 699 days.

(21) Appl. No.: 10/008,119

(22) Filed: Dec. 5, 2001

(65) Prior Publication Data

US 2003/0103664 A1    Jun. 5, 2003

(51) Int. Cl.
*G06K 9/00* (2006.01)

(52) U.S. Cl. ..................................................... 382/131
(58) Field of Classification Search ................ 382/128, 382/131, 132, 195, 201, 203, 204, 224; 378/4, 378/18, 21, 22, 23, 24, 25, 27; 600/425, 600/426; 250/363.04, 559.05, 559.21; 345/424
See application file for complete search history.

(56) References Cited

U.S. PATENT DOCUMENTS

| | | | |
|---|---|---|---|
| 6,678,399 B1 * | 1/2004 | Doi et al. | 382/131 |
| 6,690,816 B1 * | 2/2004 | Aylward et al. | 382/128 |
| 2003/0028401 A1 * | 2/2003 | Kaufman et al. | 705/3 |
| 2003/0095692 A1 * | 5/2003 | Mundy et al. | 382/128 |
| 2003/0099390 A1 * | 5/2003 | Zeng et al. | 382/131 |

* cited by examiner

*Primary Examiner*—Andrew W. Johns
*Assistant Examiner*—Shervin Nakhjavan
(74) *Attorney, Agent, or Firm*—Donald B. Paschburg; F. Chau & Associates

(57) ABSTRACT

A system and method for automatically detecting nodules from images include a seed point generation unit for generating a seed point from a plurality of images that define a volume, a volume of interest generation unit for defining a volume of interest comprising the seed point and optionally smoothing the volume of interest with a set of pre-selected scales, a volume projection unit for choosing principal viewing axes within the volume of interest, re-slicing the volume of interest along one of the principal viewing axes and computing volume projection curves of the re-sliced volumes along the principal viewing axes, and a volume projection analysis unit for analyzing the shapes of the volume projection curves, and detecting a nodule in accordance with the analyzed shapes.

23 Claims, 5 Drawing Sheets

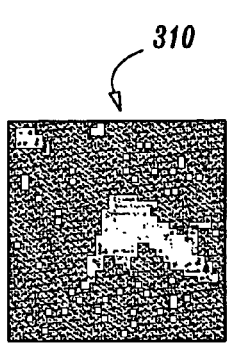
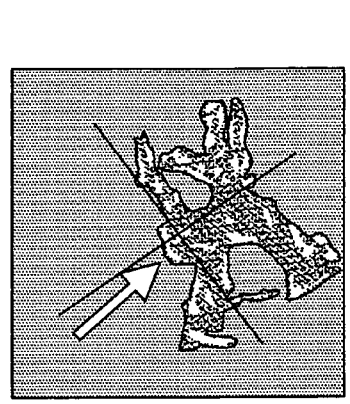
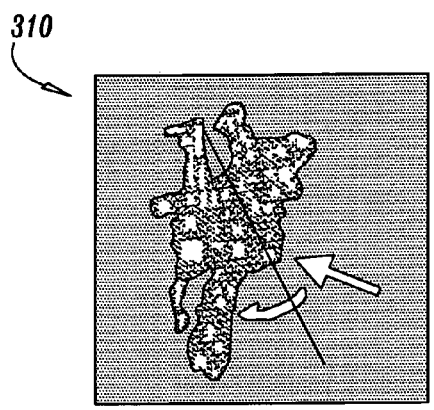
FIG. 4   FIG. 5   FIG. 6
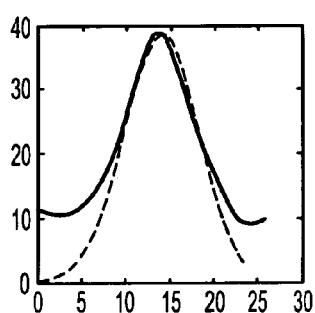
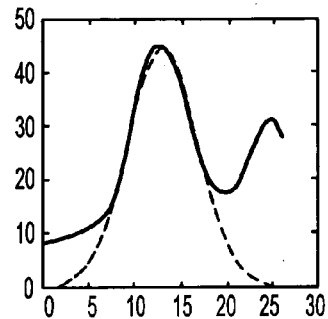
FIG. 7   FIG. 8
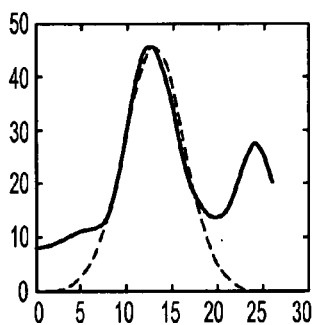
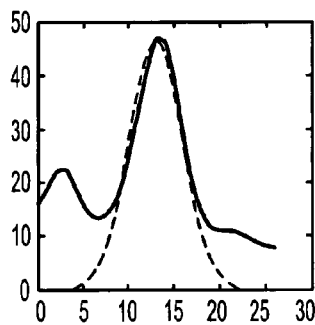
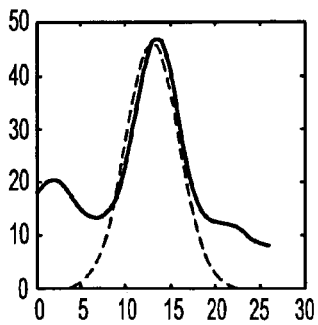
FIG. 9   FIG. 10   FIG. 11

VESSEL-FEEDING PULMONARY NODULE DETECTION BY VOLUME PROJECTION ANALYSIS

CROSS-REFERENCE TO RELATED APPLICATION

This application is related to the disclosure of co-pending Ser. No. 10/008,133 entitled "Vessel-Feeding Pulmonary Nodule Candidate Generation", commonly assigned and concurrently filed herewith, the disclosure of which is incorporated by reference herein in its entirety.

BACKGROUND

Pulmonary or lung cancer is currently a leading cause of cancer death. Early detection of cancer-related pulmonary nodules may provide the greatest chance to prevent deaths due to lung cancer. Non-invasive, high-resolution, thin-slice, multi-slice or multi-detector computed tomography ("CT") scanners are capable of providing detailed imaging data on anatomical structures. Therefore, non-invasive early detection of pulmonary nodules from CT images holds great promise.

Unfortunately, although vessel-feeding pulmonary nodules are more likely to be malignant than solitary ones, and of important clinical value, their accurate detection from CT images is highly labor-intensive, technically challenging, and requires the careful attention of trained specialists. Existing methods for detecting nodules attached to vessels are typically based on certain geometric and intensity features, such as the circularity and sphericity measures as were reported in, for example, S. G. Armato II, M. L. Giger, J. T. Blackbrun, K Doi, and H. MacMaho, "Three dimensional approach to lung nodule detection in helical CT", *Proc. SPIE Conf. Image Processing*, pp.553–559, 1999. These methods have drawbacks and disadvantages in that many false positives may be generated, especially at vessel bifurcation points.

SUMMARY

These and other drawbacks and disadvantages of the prior art are addressed by a system and method for automatically detecting vessel-feeding pulmonary nodules from computed tomography images.

Thus, a system and method for automatically detecting nodules from images include a seed point generation unit for generating a seed point from a plurality of images that define a volume, a volume of interest generation unit for defining a volume of interest comprising the seed point and optionally smoothing the volume of interest with a set of preselected scales, a volume projection unit for choosing principal viewing axes within the volume of interest, re-slicing the volume of interest along one of the principal viewing axes and computing volume projection curves of the re-sliced volumes along the principal viewing axes, and a volume projection analysis unit for analyzing the shapes of the volume projection curves, and detecting a nodule in accordance with the analyzed shapes.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches an approach to detecting pulmonary nodules, including vessel-feeding pulmonary nodules.

FIG. 4 shows a diagram illustrating one slice of a volume of interest ("VOI") comprising a vessel-feeding nodule in accordance with the embodiment of FIG. 1;

FIG. 5 shows a diagram illustrating a shaded surface view of the VOI of FIG. 4;

FIG. 6 shows a diagram illustrating a shaded surface view of the VOI of FIG. 4;

FIG. 7 shows a plot of a volume projection curve corresponding to the $1^{st}$ principal viewing axis of the VOI of FIG. 4;

FIG. 8 shows a plot of a volume projection curve corresponding to the $2^{nd}$ principal viewing axis of the VOI of FIG. 4;

FIG. 9 shows a plot of a volume projection curve corresponding to the 3rd principal viewing axis of the VOI of FIG. 4;

FIG. 10 shows a plot of a volume projection curve corresponding to the 4th principal viewing axis of the VOI of FIG. 4;

FIG. 11 shows a plot of a volume projection curve corresponding to the 5th principal viewing axis of the VOI of FIG. 4;

DETAILED DESCRIPTION OF PREFERRED EMBODIMENTS

A system and method are disclosed for automatically detecting pulmonary nodules, including nodules that are attached to vessels or so-called "vessel-feeding nodules", from non-invasive, high-resolution, thin or multi-slice computed tomography ("CT") images. A volume projection analysis ("VPA") method is implemented to make automated diagnoses. The VPA method is based on 1-dimensional ("1-D") curves obtained from lung volume image data. A multi-scale detection framework is used to detect nodules of various sizes. An exemplary set of test-criteria for finding nodules based on shape analysis of the 1-D curves is also provided.

Lung nodules can be classified into three major sub-categories, according to their relative positions to other anatomic structures, as solitary nodules, nodules attached to chest walls, and nodules attached to vessels or vessel-feeding nodules. Among these, nodules attached to chest walls are eye-catching and relatively easy to recognize for radiologists and physicians. Anatomical structures of solitary nodules are relatively simple and usually sphere-like. Nodules attached to vessels, however, are much more difficult to recognize. This is because there is no obvious structural information that can easily catch radiologists' or physicians' attention for further examination. Meanwhile, nodules with vessel-feeding morphology normally are more likely to be malignant compared with solitary ones, and of important clinical value.

A few approaches can be used to determine whether a suspicious structure is a vessel-feeding nodule. Such approaches include template matching, three-dimensional rendering and the instant VPA approach.

The present disclosure describes the VPA approach for finding lung nodules, and particularly vessel-feeding lung nodules. The VPA method may receive raw image data and/or pre-processed data, such as, for example, selected information that may be manually input, or received from an automated lung nodule candidate generation system.

Figure 1:
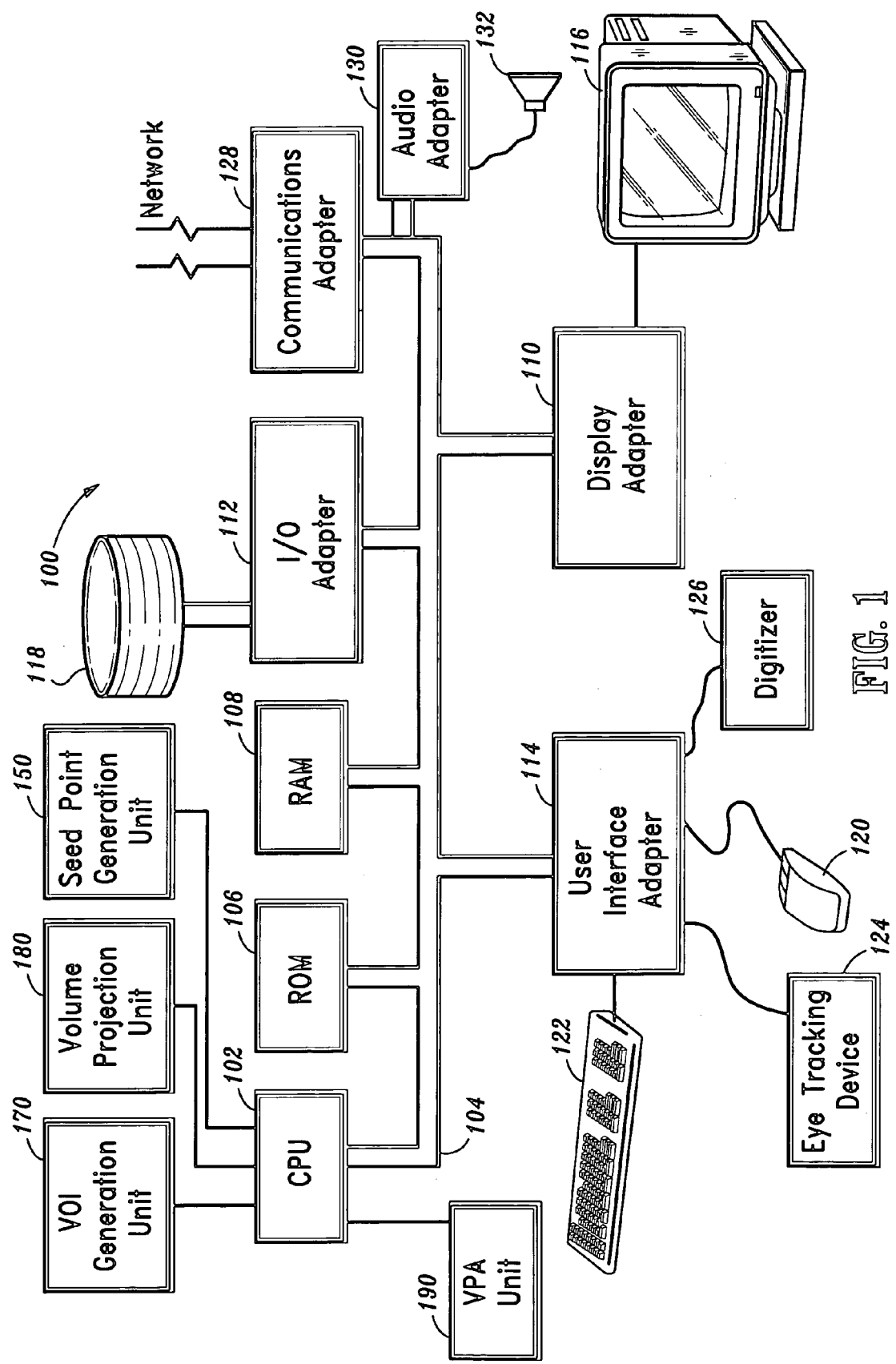
FIG. 1 shows a block diagram of a system for automatically detecting pulmonary nodules from CT images according to an illustrative embodiment of the present disclosure.

FIG. 1 shows a block diagram of a system 100 for automatically detecting pulmonary nodules from CT images, according to an illustrative embodiment of the present disclosure. The system 100 includes at least one processor or central processing unit ("CPU") 102 in signal communication with a system bus 104. A read only memory ("ROM") 106, a random access memory ("RAM") 108, a display adapter 110, an I/O adapter 112, and a user interface adapter 114 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are also in signal communication with the system bus 104 via the user interface adapter 114. The mouse 120, keyboard 122, and eye-tracking device 124 are used to aid in the detection of suspicious regions in a digital medical image.

A seed point generation unit 150, a volume of interest ("VOI") generation unit 170, a volume projection unit 180, and a volume projection analysis ("VPA") unit 190 are included in the system 100 and in signal communication with the CPU 102 and the system bus 104. While the seed point generation unit 150, the VOI generation unit 170, the volume projection unit 180, and the VPA unit 190 are illustrated as coupled to the at least one processor or CPU 102, these components are preferably embodied in computer program code stored in at least one of the memories 106, 108 and 118, wherein the computer program code is executed by the CPU 102.

The system 100 may also include a digitizer 126 in signal communication with the system bus 104 via a user interface adapter 114 for digitizing a CT image of the lungs. Alternatively, the digitizer 126 may be omitted, in which case a digital CT image may be input to the system 100 from a network via a communications adapter 128 in signal communication with the system bus 104, or via other suitable means as understood by those skilled in the art.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the seed point generation unit 150, the VOI generation unit 170, the volume projection unit 180, and the VPA unit 190, as well as the other elements of the system 100, while practicing within the scope and spirit of the present disclosure.

Figure 2:
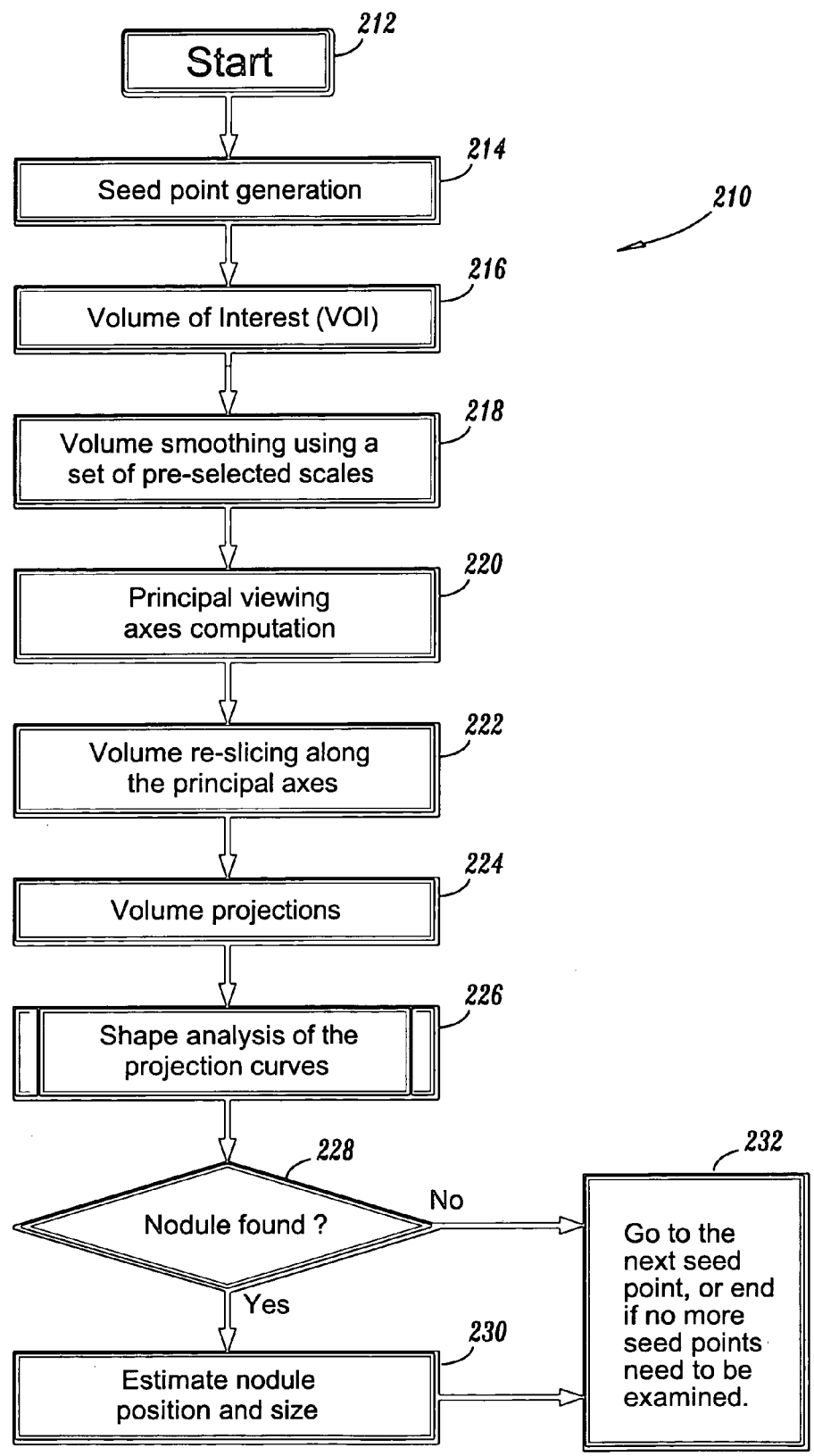
FIG. 2 shows a flow diagram for automatically detecting nodules from CT images according to an illustrative embodiment of the present disclosure.

As shown in FIG. 2, a flow diagram illustrates a method 210 for automatically detecting pulmonary nodules from CT images according to an illustrative embodiment of the present disclosure. The CT image is loaded by function block 212, and seed point generation is carried out in function block 214.

The boundaries of a volume of interest ("VOI") are defined according to the CT data by the VOI generation unit 170 of FIG. 1 at function block 216. The VOI is configured to traverse through the lung volume during nodule detection. Volume smoothing is performed at function block 218 by using a set of pre-selected scales corresponding to a number of nodule size ranges.

In function block 220, the principal viewing axes for a structure of interest comprising the seed point is extracted. In function block 222, volume re-slicing is performed along the principal viewing axes. Volume projection curves or profiles are computed in function block 224, and shape analysis of the computed curves is accomplished at function block 226, as will be described in detail with respect to FIG. 3. Decision block 228 determines whether a nodule has been found, and if so, passes control to function block 230, where the nodule size and position are estimated before passing control to function block 232. If a nodule was not found at decision block 228, control is passed directly to function block 232. Function block 232 passes control back to function block 214 for the next seed point, or exits the routine if no more seed points need to be examined.

Figure 3:
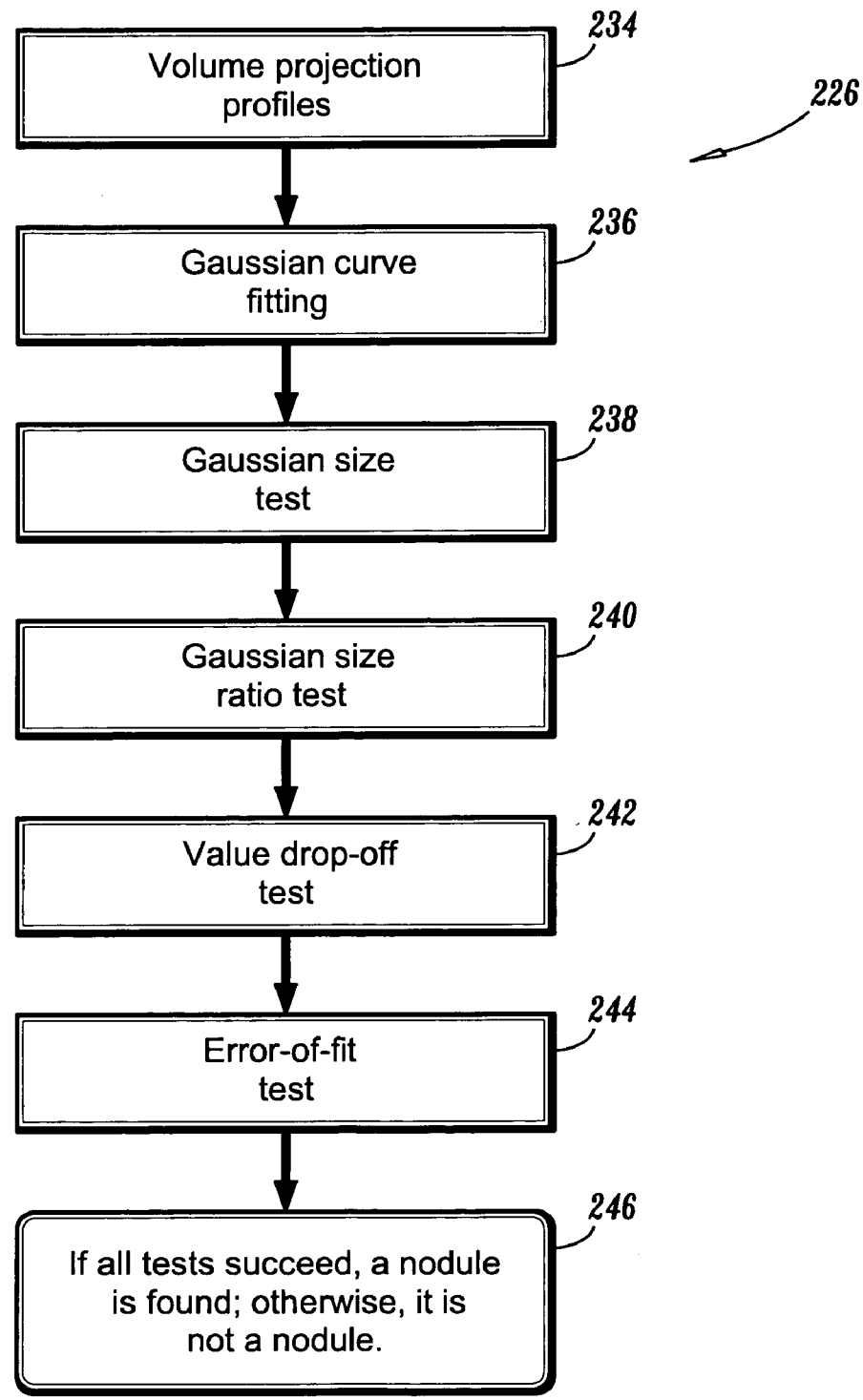
FIG. 3 shows a flow diagram for performing shape analysis in accordance with the embodiment of FIG. 1.

Turning now to FIG. 3, the VPA unit 190 of FIG. 1 analyzes each volume projection at function block 226 of FIG. 2. The volume projection profiles are analyzed at function block 234, and Gaussian curve fitting is performed at function block 236. Gaussian size testing is accomplished at function block 238, and a Gaussian size ratio test is applied at function block 240. A value drop-off test is performed at function block 242 in order to determine whether the structure is elongated, and an error-of-fit test is applied at function block 244 to check sphericity. At function block 246, a nodule is only detected if all of the preceding tests succeeded; otherwise, the structure is not considered to be a nodule.

FIGS. 4 through 11 show an exemplary sequence of the detection of a nodule according to an illustrative embodiment of the method of FIG. 2. In particular, FIG. 4 illustrates an image slice of a VOI 310. FIGS. 5 and 6 show shaded surface views of the VOI 310 of FIG. 4. FIGS. 7 through 11 show volume projection curves, indicated by solid lines, and Gaussian fitted curves, indicated by dashed lines, of the VOI 310.

Figure 12:
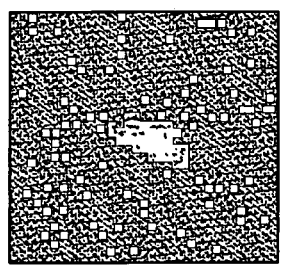
FIG. 12 shows a diagram illustrating one slice of a volume of interest ("VOI") comprising a vessel bifurcation point in accordance with the embodiment of FIG. 1.
Figure 13:
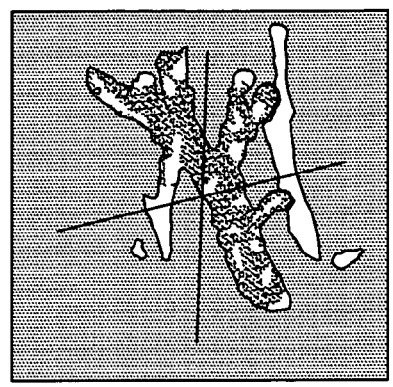
FIG. 13 shows a diagram illustrating a shaded surface view of the VOI of FIG. 12.
Figure 14:
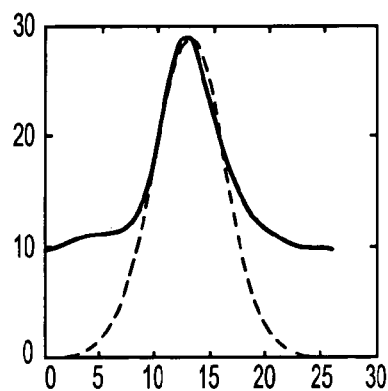
FIG. 14 shows a plot of a volume projection curve corresponding to the $1^{st}$ principal viewing axis of the VOI of FIG. 12.
Figure 15:
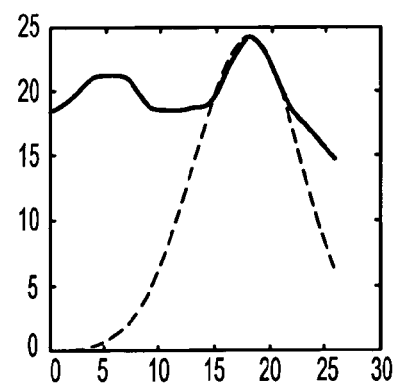
FIG. 15 shows a plot of a volume projection curve corresponding to the $2^{nd}$ principal viewing axis of the VOI of FIG. 12.

FIGS. 12 through 15 show an exemplary sequence of the exclusion of a non-nodule vessel bifurcation point according to an illustrative embodiment of the method of FIG. 2. In particular, FIG. 12 illustrates an image slice of a VOI 410. FIG. 13 shows a shaded surface view of the VOI 410 of FIG. 12. FIGS. 14 and 15 show volume projection curves, indicated by solid lines, and Gaussian fitted curves, indicated by dashed lines, of the VOI 410. The poor fit or large error of the Gaussian curve of FIG. 15 can be seen to foretell that the VOI 410 does not comprise a nodule.

Returning now to FIG. 2, the seed point generation of function block 214 generates points of interest to examine from within the lung volume. These points may be specified by scanning through the whole CT volume. To do this, only points having intensities greater than a certain threshold need to be considered. Due to the huge amount of data CT scanners generate, it is desirable that an automatic nodule candidate generation algorithm be integrated in this step. In this way, computation time can be dramatically reduced. An example of such an algorithm is the approach disclosed in co-pending Ser. No. 10/008,133 entitled "Vessel-Feeding Pulmonary Nodule Candidate Generation", commonly assigned and concurrently filed herewith, the disclosure of which has been incorporated by reference herein in its entirety. As an alternative, these seed points can be manually specified, such as, for example, by using a computer mouse to select the candidates interactively.

For the volume of interest ("VOI") generation of function block 216, a volume of interest is centered on each seed point generated in function block 214, and subsequent processing is based on this VOI. In function block 218, the volume smoothing is accomplished by using a set of scales that are chosen as smoothing sizes to smooth the VOI. Each smoothing is intended for detecting nodules of a certain size range. Generally, a larger scale for smoothing is for detecting larger nodules, but there is no restriction on the sizes of nodules that are allowably detected for each smoothing scale. Once a nodule is detected on one scale, the detection in that VOI is terminated, and no further detection on other scales of smoothing is pursued. An exemplary choice of the scales for smoothing is s={0, 3, 5} voxels, in which three scales, namely 0, 3 and 5 are chosen, where a scale of zero means no smoothing. The VOI is denoted by V(x,y,z), where the z-axis is the scanning direction, which is along the long axis of the human body, and the x-y plane corresponds to a cross-section of the image data for the human body. The volume as smoothed by scale s∈s is denoted by $I_s(x,y,z)$.

In function block 220, principal viewing axes ("PVA") are computed. Processing is based on "viewing" the volume of interest from several preferred angles. These viewing angles are represented by the principle viewing axes ("PVA"). The PVA are chosen to capture the orientation of the major structures in the VOI. The first PVA is chosen as the z-axis since the z-axis represents the navigational axis used by physicians when doing slice-by-slice image examination. The other PVA are determined by eigen-vector analysis of the volume as follows: For each voxel in the volume I(x, y, z)∈{$I_s$(x, y, z),s∈s}, the eigenvector corresponding to the smallest eigenvalue of the matrix $$H = \begin{pmatrix} I_{xx} & I_{xy} & I_{xz} \\ I_{xy} & I_{yy} & I_{yz} \\ I_{xz} & I_{yz} & I_{zz} \end{pmatrix} \quad (1)$$

is computed, where subscripts represents partial derivatives. The azimuth and elevation angles of the eigenvector are used as indices to establish a 2-D histogram of the eigenvector orientations of the VOI. Peaks in the histogram are then picked as the dominant orientations of the structural components in the VOI. For example, if the VOI contains only a vessel, the largest peak in the histogram will correspond to the vessel's orientation. In this example, the four largest peaks are picked. The number of peaks can also be adaptively determined based on the distribution of histogram values. For example, if there are no dominant peaks in the histogram, fewer peaks can be chosen. Volume re-slicing is performed in function block 222. For each of the principle viewing axes computed in block 220, the VOI is re-sliced along the directions of the PVA. This is achieved by using the PVA as the normals of the slicing planes. For each of the volumes thus obtained, the slicing plane becomes the new x-y plane and the selected one of the PVA becomes the new z-axis of the volume. The re-sliced volumes of $I_s$(x, y, z) are represented by $I_{s,k}$ (x, y, z), where k is the index of the number of PVA.

Volume projections are performed in function block 224 for each of the re-sliced volumes. Volume projection is an operation that transforms a 3-dimensional volume data into a 1-dimensional profile or curve. This data transform not only converts the necessary morphological and diagnostic information of the object of interest into a form with which a computer can more reliably perform the detection, but also significantly simplifies the analysis of the volume shape. For each of the smoothing scale s∈s, a cylinder $C_r$(x, y, z) of radius $r_s$ is generated. As an example, for s={0, 3, 5}, the radius $r_s$ may be chosen as $r_s$={3,5,7}. The cylinder is centered on the seed point and is oriented along the z-axis of the volume $I_{s,k}$(x,y,z). The volume projection is the summation of the volume intensity on each cross-section of the cylinder along the z-axis. This can be expressed as:

$$P_{s,k}(z) = \sum_{x,y \in C_r(x,y,z)} I_{s,k}(x, y, z) \quad (2)$$

An example of the volume projection is illustrated in FIGS. 4–11. FIG. 4 shows one slice of a VOI, and FIGS. 5 and 6 show two shaded surface views of the VOI, in which a nodule is seen to be attached to a vessel and is indicated by the arrows. In FIGS. 7 through 11, each solid curve shows the volume projection curves for one smoothing scale.

The shape analysis function block 226 uses the decision criteria that the projection curves for nodules attached to vessels, as well as for isolated nodules, obey a Gaussian shape, whereas for non-nodule structures, such as vessels or other anatomical structures, there is no such obedience. Therefore, distinction between nodules and non-nodules can be made by automatic analysis of the shape of the projection curves.

After the volume projection profiles are saved in function block 234, each projection profile $P_{s,k}$(z) is fitted in function block 236 by a Gaussian curve of the form:

$$G(z) = I_0 \exp\left(\frac{-(z - z_0)^2}{2\sigma^2}\right) \quad (3)$$

where $z_0$ is the center, and σ is the size of the Gaussian. FIGS. 7 through 11 also show the Gaussian-fitted curves, indicated by dashed lines, of the projection curves.

After Gaussian fitting, a sequential test of a set of shape criteria is performed as follows: A Gaussian size test is performed at function block 238, where the size σ of the Gaussian curve should be less than a certain threshold. As an example, the maximum size of the Gaussian can be set to 8 mm. A Gaussian size-ratio test is performed at function block 240, where the size ratio of the maximum size to the minimum size among the Gaussians should not exceed a certain threshold. A reasonable exemplary value for the threshold is 2.

A value drop-off test is performed at function block 242, where the drop-off in the projection value from the center of the Gaussian to both sides should be above a certain threshold. This threshold value can be set as a percentage of the maximum value $I_0$. As an example, this percentage value can be chosen as 20% of the maximum value. An error-of-fit test is performed at function block 244. The maximum error-of-fit between the projection data and the fitting curve should be within a certain threshold. This error of fit can be normalized with respect to the maximum magnitude $I_0$, so that the threshold value can be chosen as a percentage of the magnitude $I_0$. An exemplary threshold value is 35%.

A failure to pass any of the above tests leads to the decision, at function block 246 and, in turn, at decision block 228, that the current seed point is not on a nodule. Therefore, if one test fails, the rest of the tests may be skipped in order to save computational time. On the other hand, if all tests succeed, a nodule is found. An example illustrating the exclusion of a non-nodule candidate is given in FIGS. 12 through 15, where a vessel's bifurcation point is taken for a suspicious nodule candidate. FIG. 12 shows a slice of the VOI 410, while FIG. 13 is a shaded surface view of the VOI 410. Although the first volume projection curve exhibits a Gaussian shape in FIG. 14, the second projection curve fails to pass the drop-off test. Thus, the candidate is excluded immediately after this test.

Position and size estimation is performed at function block 230. When a nodule is detected, the size and position of the nodule can be estimated from the results of curve fitting of function block 236. The center of the nodule can be estimated as the average center of the Gaussians, taking into account the coordinate transformation in the re-slicing operation, while the size of the nodule can be estimated as the average size of the Guassians.

It shall be understood that the techniques disclosed herein can be applied to the detection of solitary or isolated nodules as well as vessel-feeding nodules. In addition, if the chest wall data is removed using techniques known to those skilled in the art, nodules attached to the chest wall can be detected by the same techniques disclosed herein.

After a nodule is detected, segmentation techniques, as known to those of ordinary skill in the pertinent art, can be used to segment the nodule from the background and vessels. Based on the segmentation, other measurements, such as the volume of the nodule, can then be made.

The pulmonary nodule surfaces may be rendered, and the detected pulmonary nodules may be visualized on the display 116 of FIG. 1, such as is shown in FIGS. 5, 6 and 13. For each, further processing may be directed to visualization, heuristic verification, or a three-dimensional free rotation may be provided to facilitate the study of the structure of interest and its relationship to the connected vessels and the surrounding structures. The visualization is particularly desirable when nodules are attached to pulmonary vessels. The detected nodules may be output, for example, to a user, storage medium and the like.

In operation, the present disclosure teaches automatically detecting pulmonary nodules from CT images so that radiologists and physicians can be freed from the heavy burden of reading through multitudes of image slices. An advantage of the present disclosure is the provided sensitivity to pulmonary nodules while maintaining low false-positive rates. Usually, pulmonary nodules appear in slice images as nearly circular-shaped opacities, which are similar to cross-sections of vessels. Accordingly, many existing recognition methods have a high false-positive rate. The present disclosure solves this problem by making full use of the three-dimensional image information. Multiple criteria, including Gaussian curve fitting and value drop-off tests are set up for detecting pulmonary nodules or non-nodule structure.

The present disclosure is computationally efficient, and provides for a timely method of automatic detection so that an examining physician may receive the results in a timely manner. The present disclosure teaches functions associated with the detection method to facilitate the examination of patient data by physicians. Such functions include surface rendering of structures of interest, parameter measurement, documentation of detected nodules, and the like. These and other features and advantages of the present disclosure may be readily ascertained by one of ordinary skill in the pertinent art based on the teachings herein.

It is to be understood that the teachings of the present disclosure may be implemented in various forms of hardware, software, firmware, special purpose processors, or combinations thereof. Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which is executed via the operating system. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be affected therein by one of ordinary skill in the pertinent art without departing from the scope or spirit of the present disclosure. All such changes and modifications are intended to be included within the scope of the present disclosure as set forth in the appended claims.

What is claimed is:

1. A method for automatically detecting nodules from images, the method comprising:
    generating a seed point from a plurality of images that define a volume;
    defining a volume of interest comprising the seed point;
    choosing principal viewing axes within the volume of interest;
    re-slicing the volume of interest along one of the principal viewing axes;
    computing volume projection curves of the re-sliced volumes along the principal viewing axes;
    analyzing the shapes of the volume projection curves; and detecting a nodule in accordance with the analyzed shapes.

2. A method as defined in claim 1, further comprising: smoothing the volume of interest using a set of pre-selected scales.

3. A method as defined in claim 1, further comprising: estimating nodule size and position.

4. A method as defined in claim 1 wherein analyzing comprises:
Gaussian curve fitting;
Gaussian size testing;
Gaussian size-ratio testing;
value drop-off testing; and
error-of-fit testing.

5. A method as defined in claim 1 wherein said images comprise at least one of high-resolution, thin-slice and multi-slice computed tomography images.

6. A method as defined in claim 1 wherein the volume comprises a lung volume.

7. A method as defined in claim 1 wherein said nodule comprises a vessel-feeding pulmonary nodule.

8. A method as defined in claim 1 wherein said nodule comprises a solitary pulmonary nodule.

9. A method as defined in claim 1, further comprising: displaying said nodule.

10. A method as defined in claim 9 wherein said displaying said nodule comprises:
rendering surfaces of said nodule to provide three-dimensional visualization with the freedom of 3-D rotation.

11. A method as defined in claim 1 wherein said defining a volume of interest comprises:
defining a shape and a size of the volume of interest.

12. A method as defined in claim 1 wherein said detecting comprises:
recording a detected, anatomical structure for future retrieval.

13. A method as defined in claim 1 wherein said detecting comprises:
excluding non-nodule structures from further evaluation.

14. A method as defined in claim 1, further comprising: storing the automatic detection decision.

15. A system for automatically detecting nodules from image data, the system comprising:
a seed point generation unit for examining the image data to generate a seed point;
a volume of interest generation unit in signal communication with the seed point generation unit for defining a volume of interest comprising the seed point and choosing principal viewing axes within the volume of interest;
a volume projection unit in signal communication with the volume of interest generation unit for re-slicing the volume of interest along one of the principal viewing axes, computing volume projection curves of the re-sliced volume along the principal viewing axes and projecting 1-D curves indicative of shape; and
a volume projection analysis unit in signal communication with the volume projection unit for analyzing the shapes of the volume projection curves and detecting a nodule in accordance with the analyzed shapes.

16. A system as defined in claim 15 wherein said image data comprises high-resolution, thin-slice, multi-slice, computed tomography images.

17. A system as defined in claim 15 wherein said volume of interest comprises a lung volume.

18. A system as defined in claim 17, further comprising:
a display adapter in signal communication with the CPU for displaying said nodule; and
an I/O adapter in signal communication with the CPU for recalling the shape features of the nodule.

19. A system as defined in claim 15 wherein said nodule comprises a vessel-feeding pulmonary nodule.

20. A system as defined in claim 15, further comprising:
a CPU in signal communication with said volume projection analysis unit for examining said nodule.

21. A system as defined in claim 20, further comprising:
a user interface adapter in signal communication with the CPU for receiving an external selection decision for a seed point from a user.

22. A system for automatically detecting nodules from image data, the system comprising:
means for generating a seed point from a plurality of images that define a volume;
means for defining a volume of interest comprising the seed point;
means for choosing principal viewing axes within the volume of interest;
means for re-slicing the volume of interest along one of the principal viewing axes;
means for computing volume projection curves of the re-sliced volume along the principal viewing axes;
means for analyzing the shapes of the volume projection curves; and
means for detecting a nodule in accordance with the analyzed shapes.

23. A program storage device readable by machine, tangibly embodying a program of instructions executable by the machine to perform method steps for automatically detecting nodules from image data, the method steps comprising:
generating a seed point from a plurality of images that define a volume;
defining a volume of interest comprising the seed point;
choosing principal viewing axes within the volume of interest;
re-slicing the volume of interest along one of the principal viewing axes;
computing volume projection curves of the re-sliced volumes along the principal viewing axes;
analyzing the shapes of the volume projection curves; and
detecting a nodule in accordance with the analyzed shapes.

* * * * *